US008873588B2

(12) United States Patent
Joergensen

(10) Patent No.: US 8,873,588 B2
(45) Date of Patent: Oct. 28, 2014

(54) NETWORK DISTRIBUTED PACKET-BASED SYNCHRONIZATION

(75) Inventor: Thomas Kirkegaard Joergensen, Soeborg (DK)

(73) Assignee: Vitesse Semiconductor Corporation, Camarillo, CA (US)

( * ) Notice: Subject to any disclaimer, the term of this patent is extended or adjusted under 35 U.S.C. 154(b) by 60 days.

(21) Appl. No.: 13/470,197

(22) Filed: May 11, 2012

(65) Prior Publication Data

US 2012/0300795 A1    Nov. 29, 2012

Related U.S. Application Data

(60) Provisional application No. 61/485,090, filed on May 11, 2011.

(51) Int. Cl.
*H04J 3/06*    (2006.01)
(52) U.S. Cl.
CPC .............. *H04J 3/0667* (2013.01); *H04J 3/0697* (2013.01); *H04J 3/0673* (2013.01)
USPC ........................................................ 370/503
(58) Field of Classification Search
USPC .............. 370/350, 503, 355, 395.54, 395.62, 370/507–508, 511; 342/387; 375/355
See application file for complete search history.

(56) References Cited

U.S. PATENT DOCUMENTS

| | | | |
|---|---|---|---|
| 2010/0074278 A1* | 3/2010 | Dobjelevski et al. | 370/503 |
| 2011/0051754 A1* | 3/2011 | Lansdowne | 370/503 |
| 2012/0026041 A1* | 2/2012 | Murdock et al. | 342/387 |
| 2012/0263264 A1* | 10/2012 | Peng | 375/355 |
| 2013/0039359 A1* | 2/2013 | Bedrosian | 370/350 |

* cited by examiner

*Primary Examiner* — Kwang B Yao
*Assistant Examiner* — Syed M Bokhari
(74) *Attorney, Agent, or Firm* — Klein, O'Neill & Singh, LLP

(57) ABSTRACT

A transparent clock may be provided between edge nodes of a non-precision time protocol network, with an arrival time of a packet at an edge of the non-precision time protocol network carried in a reserved field of a packet.

9 Claims, 9 Drawing Sheets

| Bits | | | | | | | | Octets |
|---|---|---|---|---|---|---|---|---|
| 7 | 6 | 5 | 4 | 3 | 2 | 1 | 0 | |
| transportSpecific | | | | messageType | | | | 1 |
| reserved | | | | versionPTP | | | | 1 |
| messageLength | | | | | | | | 2 |
| domainNumber | | | | | | | | 1 |
| reserved | | | | | | | | 1 |
| flagField | | | | | | | | 2 |
| correctionField | | | | | | | | 8 |
| Reserved | | | | | | | | 4 |
| sourcePortIdentity | | | | | | | | 10 |
| sequenceID | | | | | | | | 2 |
| controlField | | | | | | | | 1 |
| logMessageInterval | | | | | | | | 1 |

NETWORK DISTRIBUTED PACKET-BASED SYNCHRONIZATION

CROSS REFERENCE TO RELATED APPLICATIONS

This application claims the benefit of U.S. Provisional Application No. 61/485,090, filed on May 11, 2011, the disclosure of which is incorporated herein by reference.

BACKGROUND OF THE INVENTION

The present invention relates generally to synchronization of clocks and, more particularly, to synchronization of clocks in a packet-switched communication network.

It may be advantageous in a networked system for devices in the network to have a common time base. The common time base may be used, for example, to trigger coordinated measurement instances in a network of sensors or to coordinate actions of controllers in an industrial system. In addition to sensors and controllers, the system may include computers and communication devices, such as routers.

The communications industry has developed several standards for use in synchronizing clocks, for example, the Network Time Protocol (NTP), ITU-T Y.1731, and the Precision Time Protocol (PTP) of IEEE 1588. PTP includes sending timing-related synchronization messages between nodes in a communication network. The synchronization messages include, for example, a node transmitting a time-stamped packet to supply its timebase to another node and a node transmitting a packet requesting the receiving node to reply with the time of receipt in order to measure the delay between the nodes. Any errors in handling the synchronization messages may be detrimental to accurate clock synchronization and the harm may be cumulative over multiple network devices. Furthermore, some portions of a communication network may not be equipped to handle synchronization messages.

BRIEF SUMMARY OF THE INVENTION

Some aspects of the present invention provide a method of performing timing related processing, the method comprising: synchronizing a clock of a first Ethernet line card and a second Ethernet line card separated by a non-precision time protocol network, the first Ethernet line card being part of a first node and the second Ethernet line card being part of a second node of the non-Precision Time Protocol network, the first Ethernet line card and the second Ethernet line card each being connected to a precision time protocol network and the second; determining a time of arrival of a packet at the first Ethernet line card; inserting an indication of the time of arrival of the packet at the first Ethernet line card into a reserved field of the packet; transmitting the packet over the non-precision time protocol network to the second Ethernet line card; determining a time of departure of the packet from the second Ethernet line card; and adding a value equal to the time of departure of the packet from the second Ethernet line card minus the time of arrival of the packet at the first Ethernet line card to a value of a correction field of the packet.

Another aspect of the invention provides a method of performing timing related processing, comprising: receiving a synchronization packet at a first network device having a port that serves as an ingress port from a device using precision time protocol synchronization; determining, by the first network device, a time of reception of the packet, using a clock local to the first network device; supplying the synchronization packet and the time of reception to a second network device; and establishing a boundary clock in the second network device.

These and other aspects of the invention are more fully comprehended upon review of this disclosure.

BRIEF DESCRIPTION OF THE FIGURES

FIG. 4 is a diagram of a message structure in accordance with aspects of the invention;

DETAILED DESCRIPTION

Figure 1:
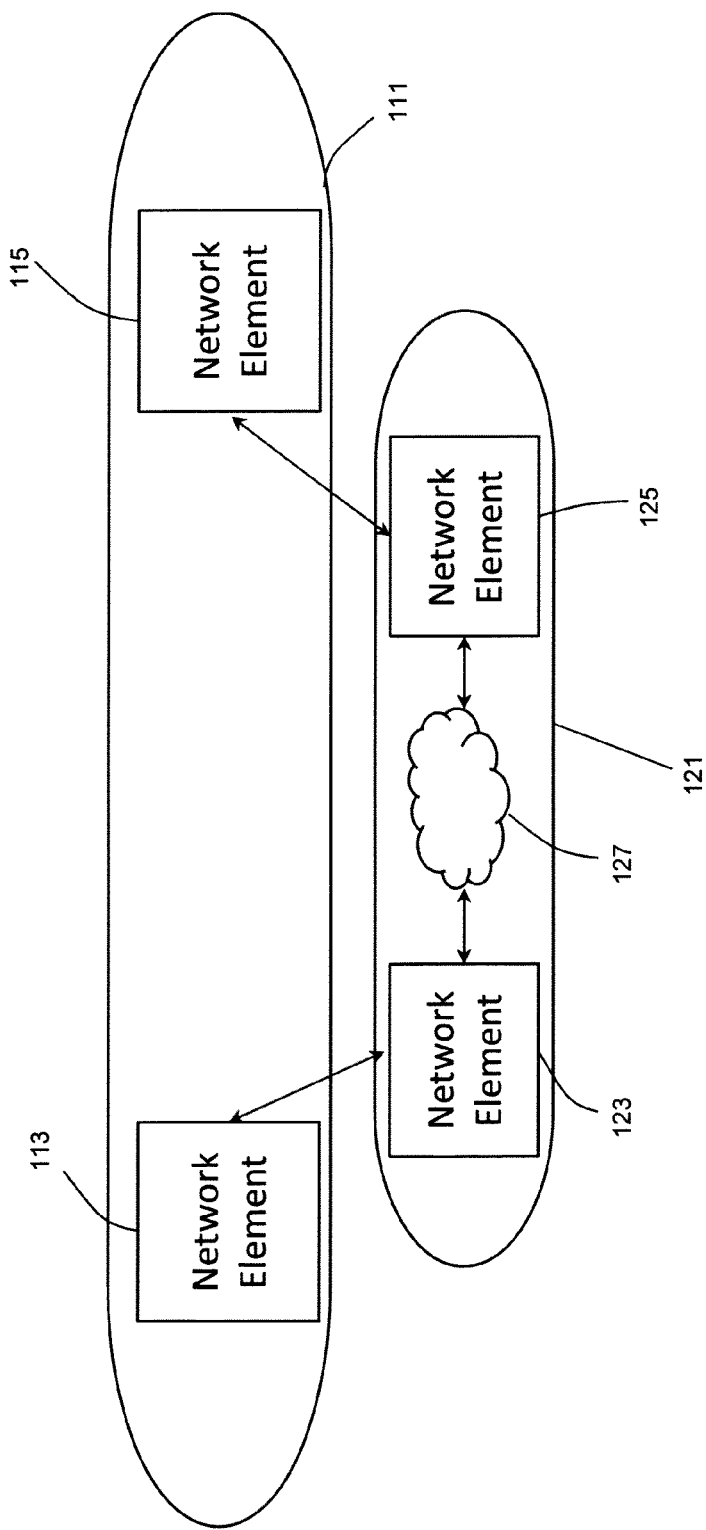
FIG. 1 is a block diagram of communication networks in accordance with aspects of the invention.

FIG. 1 is a block diagram of communication networks in accordance with aspects of the invention. The communication networks include a first network device 113 and a second network device 115 that operate in a first network 111 or network domain. The network devices may be, for example, routers. The network devices may also be a combination of devices managed as a network element. The first network device 113, the second network device 115, and additional devices that may be in the first network 111 use a synchronization protocol such as PTP to synchronize clocks at the various devices. The synchronized clocks provide matching time of day and frequency at the synchronized devices. For example, the first network device 113 may serve as a master clock with the second network device 115 having a clock slaved to the master clock. The first network device 113 and the second network device 115 communicate through a second communication network 121. As shown in FIG. 1, the first network device 113 may be connected to a third network device 123 that is coupled, possibly through additional devices 127, to a fourth network device 125 that is connected to the second network device 115. The devices in the second network 121 do not perform according to the timing protocol used in the first network 111 or may perform in a manner, for example, having asymmetrical or variable delays, that does not provide accurate timing. The third network device 123 and the fourth network device 125 process synchronization packets passing between the first network device 113 and the second network device 115 so that the first network device 113 and the second network device 115 may have accurately synchronized clocks. The communication networks of FIG. 1 generally provide communication of information in addition to packets used for synchronization. In some embodiments, the networks or some devices do not provide general communication but do provide synchronization functions.

Timing protocols, such as PTP, often rely in part on symmetrical delays between network devices to synchronize clocks between the devices. For example, to compensate for the delay from a master clock to a slave clock, a round-trip delay between the master device and the slave device may be measured and the delay from the master clock to the slave clock taken to be one half of the round-trip delay. Some network paths may have delays that are asymmetrical or that are variable. For example, in a ring connected network, delay will generally vary depending on which direction in the ring a packet travels. Additionally, in a network with different data rates depending on the direction, such as a passive optical network, delays in the slower direction may be greater than delays in the faster direction. In another example, as a synchronization packet traverses a network device, it may be delayed by other communication with the delay varying with the amount communication traffic. Additionally, delay incurred by a synchronization packet may vary with environmental conditions, for example, in a microwave relay network, over-the-air delay increases during precipitation.

To compensate for asymmetrical or varying delays in the second network 121 of FIG. 1, the third network device 123 and fourth network device 125 provide special handling of synchronization packets. The third network device 123 and fourth network device 125 have clocks synchronized to each other. Other devices in the second network 121 may also be synchronized to the third network device 123 and the fourth network device 125. The devices may be synchronized using, for example, global positioning system (GPS) signals, optical signals, microwave relay signals, gigabit passive optical networking (GPON) signaling, time division multiplexing (TDM) signaling, or a dedicated pulse-per-second (PPS) signal. Although devices in the second network 121 are synchronized together, the devices are not generally synchronized to the devices in the first network 111.

The third network device 123 and fourth network device 125 may provide a transparent clock path through the second network 121. To provide a transparent clock, the third network device 123 and fourth network device 125 measure delays incurred by synchronization packets through the second network 121 utilizing their jointly synchronized clocks. The measured delays may be used to adjust timestamps in the synchronization packets or may be included in the synchronization packets for use in a device receiving the synchronization packets.

The third network device 123, the fourth network device 125, or both may provide a boundary clock synchronized to timing in the first network 111. The boundary clock may then serve as a master clock to devices in the first network 111. The third network device 123 and fourth network device 125 utilize their jointly synchronized clocks and synchronization packets from the first network 111 to establish the boundary clock. In some embodiments, the third network device 123 and the fourth network device 125 may provide a transparent clock and a boundary clock.

In one embodiment, the first network is an Ethernet network with network devices that support PTP and the second network is a passive optical network with network devices that do not support accurate PTP. In another embodiment, the first network is an Ethernet network with network devices that support PTP and the second network is an optical transport network (OTN) with network devices that do not support accurate PTP. In another embodiment, the first network is an Ethernet network with network devices that support PTP and the second network is microwave relay network with network devices that do not support accurate PTP. In another embodiment, the first network is an Ethernet network with network devices that support PTP and the second network is ring network that does not support accurate PTP. In another embodiment, the first network is an Ethernet network with network devices that support PTP and the second network is an Ethernet network with network devices that do not support accurate PTP.

Figure 2:
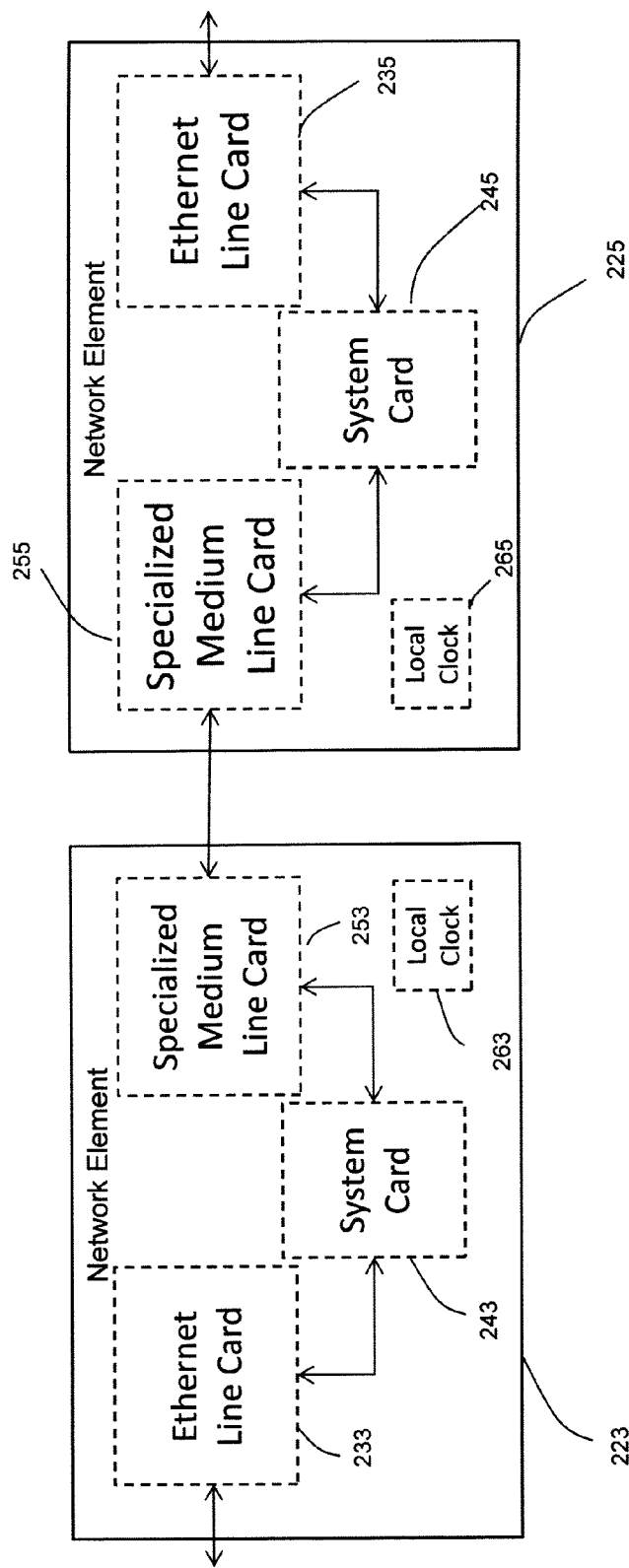
FIG. 2 is a block diagram of network devices for a transparent clock in accordance with aspects of the invention.

FIG. 2 is a block diagram of network devices for providing a transparent clock in accordance with aspects of the invention. A first network device 223 and a second network device 225 are shown in FIG. 2. The devices may operate in a network, such as the second network of FIG. 1, that is not configured to provide timing synchronization according to the PTP protocol. Each of the devices is connected to a network device in another network that does provide timing synchronization according the PTP protocol. The first network device 223 and the second network device 225 are also connected to each other, through additional devices in some embodiments. Synchronization packets that arrive at the first network device 223 and the second network device 225 are processed so that the devices in the network providing timing synchronization according the PTP protocol may be accurately synchronized.

The first network device 223 includes, in the embodiment illustrated in FIG. 2, a first Ethernet line card 233. The first Ethernet line card 233 sends and receives packets according to an Ethernet protocol via a communication port to and from the network that uses PTP. The first Ethernet line card 233 is coupled to a first system card 243. The first system card 243 performs operations such as routing packets between various ports of the first network device 223. The first network device 223 also includes a first specialized media card 253. The first specialized media card 253 couples the first network device 223 to the second network device 225. The card is specialized in that it is for coupling to devices that do not support PTP or that do not support accurate PTP synchronization. Additionally, the card may connect to a network that is not made up of linear links, such as a passive optical network that has one-to-many links. The first specialized media card 253 is also coupled to the first system card 243.

The second network device 225 is similar to or the same as the first network device 223. A second Ethernet line card 235 sends and receives packets via a communication port to and from the network that uses PTP. The second Ethernet line card 235 is coupled to a second system card 245 that is also coupled to a second specialized media card 255. The second specialized media card 255 couples the second network device 225 to the first network device 223. The network devices of FIG. 2 are shown with one Ethernet line card and one specialized media card; however, the network devices, in many embodiments, have additional line cards. Particular operations performed by the line cards may be established when the devices are provisioned.

The first network device 223 includes a first local clock 263. The second network device 225 includes a second local clock 265. The clocks are synchronized to each other. The clocks may be synchronized using techniques included in the communication protocol that connects the first network device 223 and the second network device 225. For example, the devices may be connected using GPON with the local clocks synchronized using a time of day delivery function of GPON. The clocks may also be synchronized using a technique, such as GPS, that is external to communication between the first network device 223 and the second network device 225.

The network devices process synchronization packets arriving at their Ethernet line cards so that other devices may accurately synchronize their clocks using PTP. The Ethernet line cards cooperate to provide a transparent clock function for synchronization packets passing through the first network device 223 and the second network device 225, and through other devices that may couple the first network device 223 and the second network device 225. The first network device 223 and the second network device 225 provide a transparent clock by utilizing their local clocks to measure delays incurred by synchronization packets.

In an example operation of the network devices handling PTP synchronization packets, a device with a master clock is coupled to the first Ethernet line card 233 and a device with a slave clock is coupled to the second Ethernet line card 235. The master clock device may send a packet with a Sync message to the slave clock device. When the Sync packet arrives at the first Ethernet line card 233, the time of reception is measured using the first local clock 263. The Sync packet and an indication of the time of reception are supplied to the first specialized media card 253 via the first system card 243. The first specialized media card 253 transmits the Sync packet and the indication of the time of reception to the second network device 225, via intermediary devices in some embodiments. In the second network device 225, the Sync packet and the indication of the time of reception are supplied via the second specialized media card 255 and the second system card 245 to the second Ethernet line card 235. The second Ethernet line card 235 determines the transmission time for the Sync packet and updates a correction field in the Sync message to reflect the delay incurred since reception at the first Ethernet line card 233. The difference between the time of transmission and time of reception is added to a correction field in the Sync message. In various embodiments, the time of transmission may be a predicted time, a scheduled time, or an actual time with the packet updated accordingly. For example, the timing information may be updated after the start of the packet has been transmitted with the actual time of transmission used to update the timing information while other parts of the packet are transmitted. In some embodiments, the second network device 225 may also recover timing locked to the PTP master clock.

The first Ethernet line card 233 may supply the indication of the time of reception, in some embodiment, by inserting the time of reception in a reserved location in the packet containing the Sync message. In other embodiments, the first Ethernet line card 233 may append the time of reception to the packet containing the Sync message. For example, the time of reception may be formatted as an IEEE 1588 type-length-value (TLV) field. In other embodiments, the indication of the time of reception is indirectly supplied to the second Ethernet line card 235. The first Ethernet line card 233 subtracts the time of reception from a value present in the correction field when received. The second Ethernet line card 235 then adds the time of transmission to the correction field. By subtracting the time of reception and adding the time of transmission to the correction field, the correction field is effectively updated for the delay incurred by synchronization packets from entering the first network device 223 to exiting the second network device 235.

Figure 3:
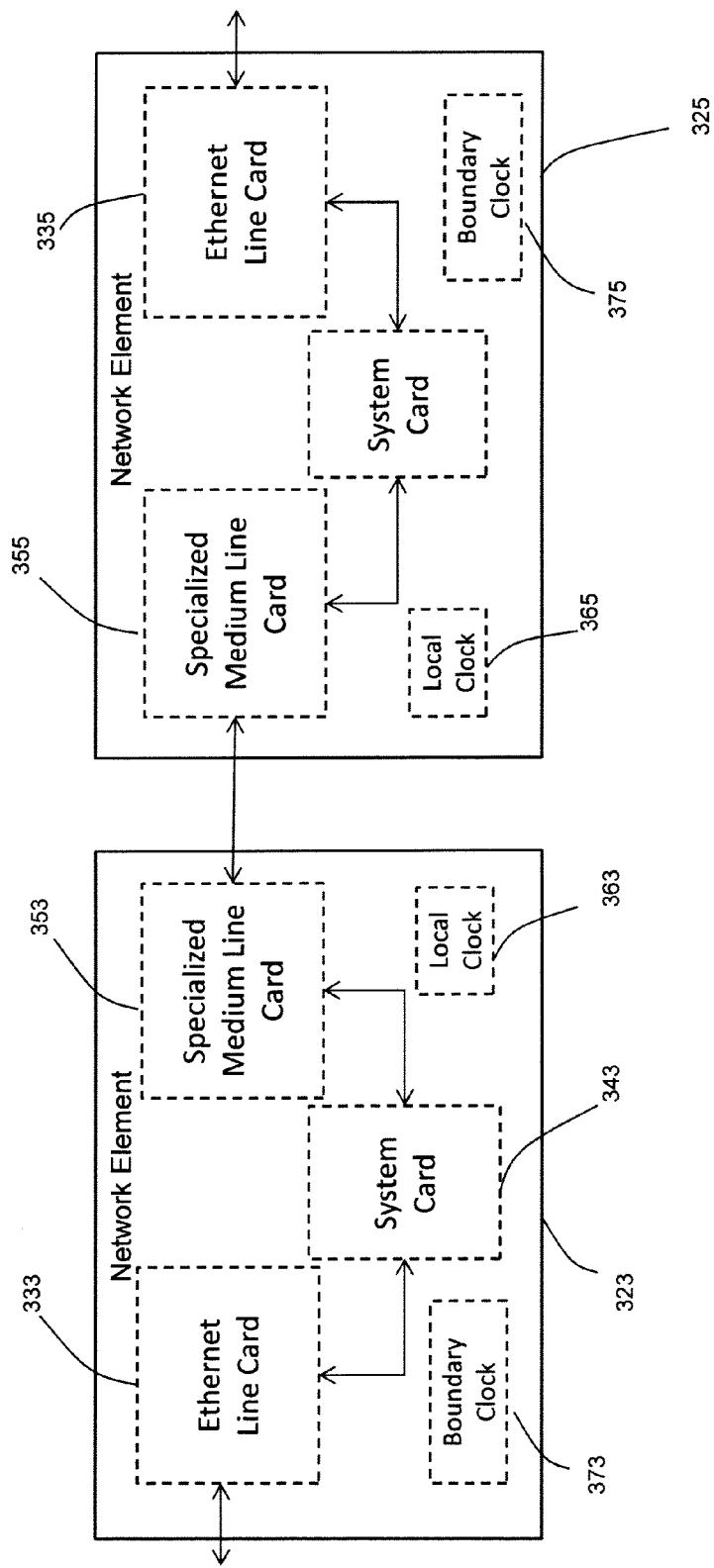
FIG. 3 is a block diagram of network devices for a boundary clock in accordance with aspects of the invention.

FIG. 3 is a block diagram of network devices for providing boundary clocks in accordance with aspects of the invention. A first network device 323 and a second network device 325 are shown in FIG. 3. The devices may operate in a network that is not configured to provide timing synchronization according the PTP protocol. Each of the devices is connected to a network device in another network that does provide timing synchronization according the PTP protocol. The first network device 323 and the second network device 325 are also connected to each other, through additional devices in some embodiments. Synchronization packets that arrive at the first network device 323 and the second network device 325 are processed so that the devices in the network providing timing synchronization according to the PTP protocol may be accurately synchronized.

The first network device 323, in the embodiment illustrated in FIG. 3, is similar to the network devices of FIG. 2. A first Ethernet line card 333 sends and receives packets via a communication port to and from the network that uses PTP. The first Ethernet line card 333 is coupled to a first system card 343 that is coupled to a first specialized media card 353. The first specialized media card 353 couples the first network device 323 to the second network device 325.

The second network device 325 is similar to or the same as the first network device 323. A second Ethernet line card 335 sends and receives packets via a communication port to and from the network that uses PTP. The second Ethernet line card 335 is coupled to a second system card 345 that is also coupled to a second specialized media card 355. The second specialized media card 355 couples the second network device 325 to the first network device 323. The network devices of FIG. 3 are shown with one Ethernet line card and one specialized media card; however, the network devices, in many embodiments, have additional line cards.

The first network device 323 includes a first local clock 363, and the second network device 325 includes a second local clock 365. The clocks are synchronized to each other using a technique included in the communication protocol that connects the network devices or using a technique that is external to communication between the network devices. In some embodiments, the local clocks are syntonized using a PPS signal and may receive time of day information from PTP synchronization packets.

In the embodiment of FIG. 3, the first network device 323 also includes a first boundary clock 373. The second network device 325 includes a second boundary clock 375. In other embodiments, only one of the network devices includes a boundary clock. The boundary clocks are synchronized to a clock in the network that uses PTP. The boundary clocks may serve as master clocks to slave clocks in the PTP network. The boundary clocks, to provide absolute time synchronization to the PTP network, may filter received timing information and use a high-quality oscillator such as a temperature-controlled crystal oscillator.

The network devices process synchronization packets arriving at their Ethernet line cards in order to synchronize their boundary clocks. In an example operation of the network devices handling PTP synchronization packets, a device with a master clock is coupled to the first Ethernet line card 333 and a device with a slave clock is coupled to the second Ethernet line card 335. The master clock device may send a packet with a Sync message to the second network device 325. When the Sync packet arrives at the first Ethernet line card 333, the time of reception is measured using the first local clock 363. The Sync packet and an indication of the time of reception are supplied to the first specialized media card 353 via the first system card 343. The first specialized media card 353 transmits the Sync packet and the indication of the time of reception to the second network device 325, via intermediary devices in some embodiments. In the second network device 325, the Sync packet and the indication of the time of reception are used to synchronize the second boundary clock 375. The first Ethernet line card 333 may supply the indication of the time of reception, in some embodiment, by inserting the time of reception in a reserved location in the packet containing the Sync message. In other embodiments, the first Ethernet line card 333 may append the time of reception to the packet containing the Sync message.

FIG. 4 is a diagram of a message structure in accordance with aspects of the invention. The message structure may be used in synchronization packets, such as the packets described for synchronization in FIGS. 1-3. The message structure includes a reserved field 401 for supplying an indication of a time of reception between network devices. A network device may write the reserved field 401 with the indication of the time of reception of a packet containing a synchronization message having the message structure of FIG. 5. Values in the reserved field 401 may be formatted with larger resolution (greater than the delay between network devices) information omitted. A network device is able to recreate the omitted information using its local clock. As shown in FIG. 4, the reserved field 401 may be a 32-bit field. The least-significant bit may represent one nanosecond. The message structure includes additional fields that may indicate a particular type of message and other values for use in clock synchronization.

Figure 5:
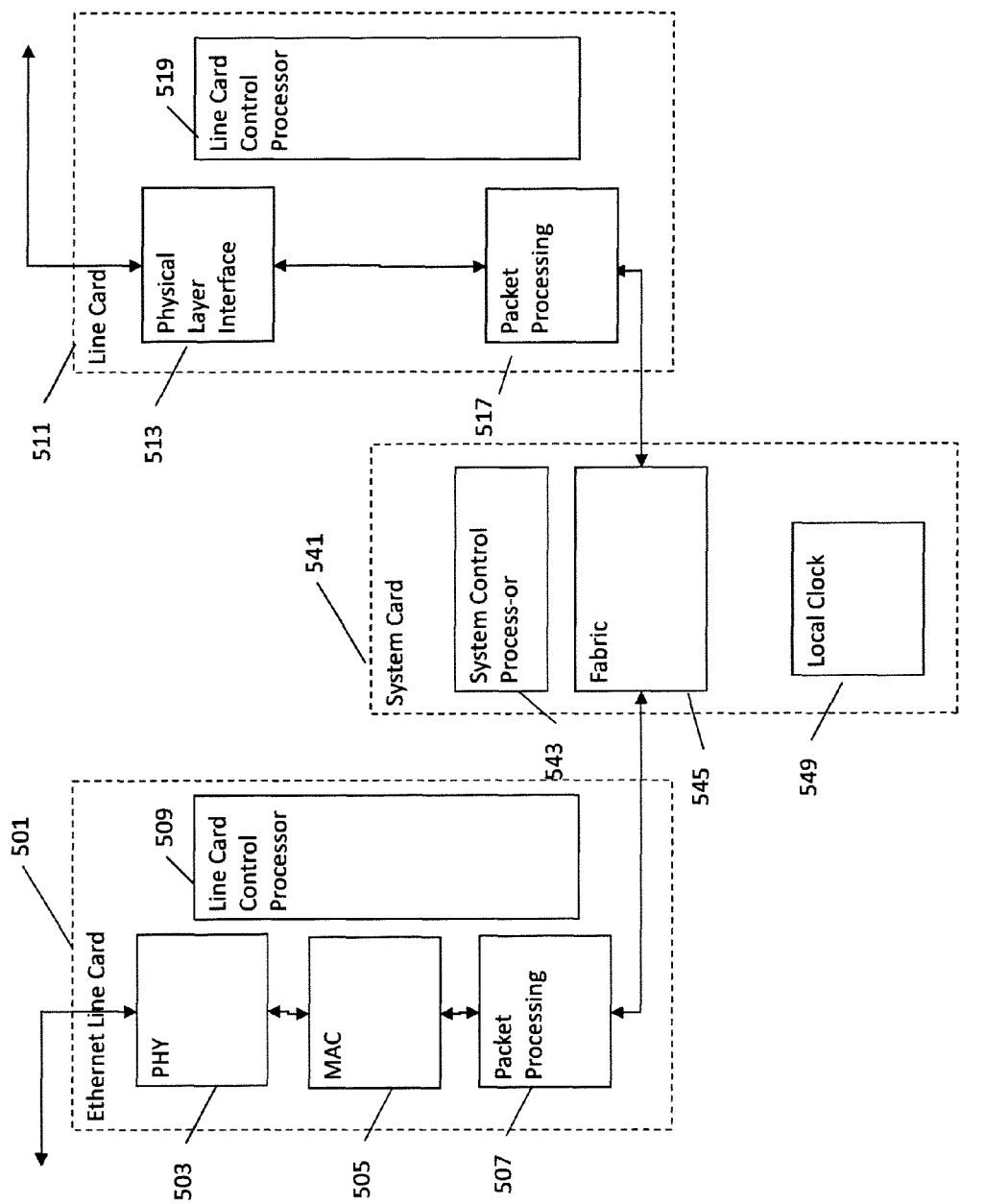
FIG. 5 is a block diagram of a network device in accordance with aspects of the invention.

FIG. 5 is a block diagram of a network device in accordance with aspects of the invention. The network device may be used in providing a PTP transparent clock in a communication network that has devices that do not support PTP. The network device may, for example, be one of the network devices of FIG. 2. The network device includes an Ethernet line card 501 and a specialized media line card 511 that are coupled through a system card 541. The Ethernet line card 501 includes a PHY 503 that couples to an Ethernet link for communication with another network device. The PHY 503 may provide timestamp processing. For example, the PHY 503 may determine the arrival time of a synchronization packet and include an indication the time in the packet, or the PHY 503 may determine a transmission time of a synchronization packet and update values in the packet using the transmission time. The PHY 503 is coupled to a MAC 505 which is coupled to a packet processing module 507. Operation of the Ethernet line card 501 is controlled and monitored by a line card control processor 509. In some embodiments, the MAC 505 or the packet processing module 507 may provide timestamp processing or part of the timestamp processing. For example, the PHY 503 may determine the arrival time of a synchronization packet with the packet processing module 507 modifying the packet using the arrival time determined by the PHY 503.

The specialized media line card 511 includes a physical layer interface 513 that couples to a specialized media link, such as GPON, for communication with other network devices. The physical layer interface 513 is coupled to a packet processing module 517. Operation of the specialized media line card 511 is controlled and monitored by a line card control processor 519.

The system card 541 is coupled to the packet processing modules in the Ethernet line card 501 and the specialized media line card 511. The network device may, in some embodiments, include many more line cards than the two line cards illustrated in FIG. 5. A switch fabric 545 couples the line cards and switches packets between line cards. A system control processor 543 controls and monitors operation of the system card 541. The system card 541 also includes a local clock 549. The local clock 549 is synchronized to a clock that is in another network device that is coupled to the specialized media line card 511. The local clock 549 is used by the Ethernet line card 501 for synchronization processing. In some embodiments, the local clock 549 may be located in the Ethernet line card 501.

Figure 6:
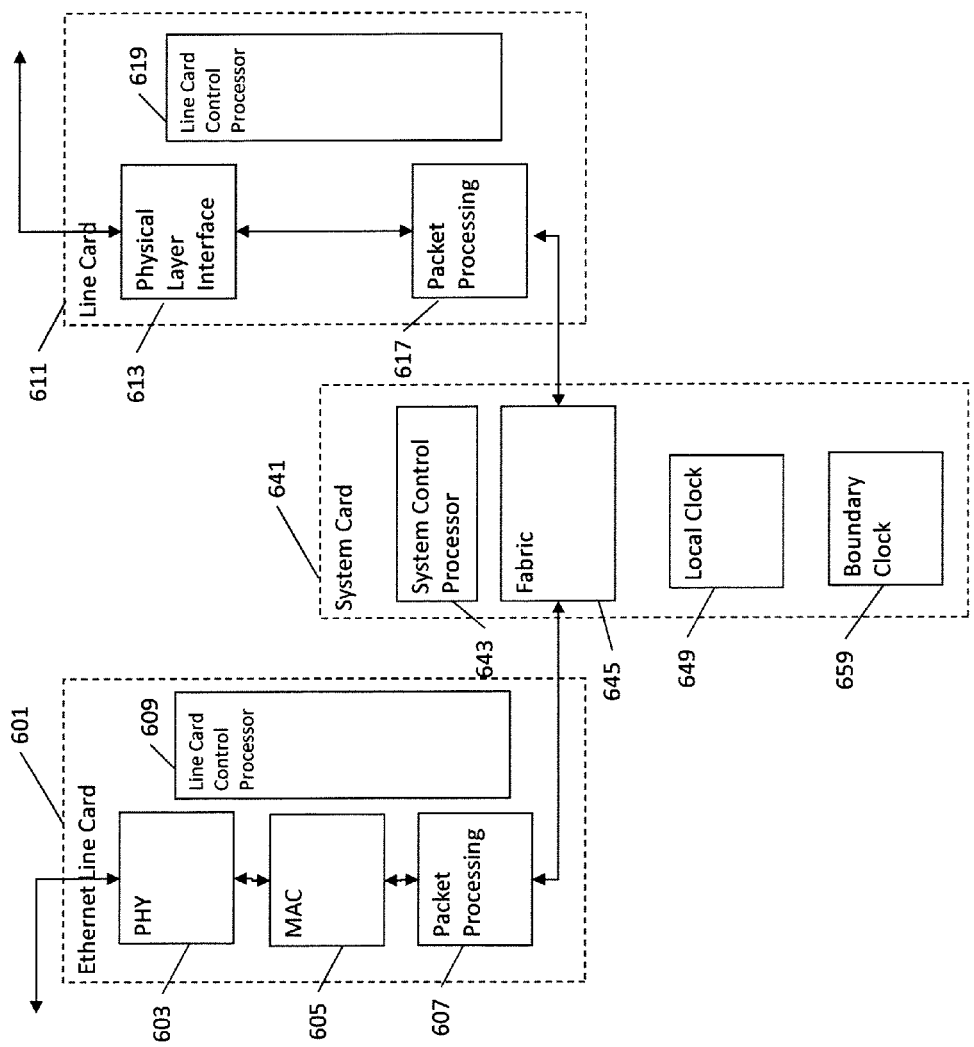
FIG. 6 is a block diagram of another network device in accordance with aspects of the invention.

FIG. 6 is a block diagram of another network device in accordance with aspects of the invention. The network device may be used in providing a PTP boundary clock in a communication network that includes devices that do not support PTP. The network device may, for example, be one of the network devices of FIG. 3. The network device of FIG. 6 is similar to the network device of FIG. 6 and includes an Ethernet line card 601 and a specialized media line card 611 that are coupled through a system card 641. The Ethernet line card 601 includes a PHY 603 that couples to Ethernet link for communication with another network device. The PHY 603 provides timestamp processing for synchronization packets. The PHY 603 is coupled to a MAC 605 which is coupled to a packet processing module 607. A line card control processor 609 controls and monitors operation of the Ethernet line card 601.

The specialized media line card 611 includes a physical layer interface 613 that couples to a specialized media link for communication with other network devices. The physical layer interface 613 is coupled to a packet processing module 617. Operation of the specialized media line card 611 is controlled and monitored by a line card control processor 619.

The system card 641 is coupled to the packet processing modules in the Ethernet line card 601 and the specialized media line card 611. The network device may, in some embodiments, include many more line cards than the two line cards illustrated in FIG. 6. A switch fabric 645 couples the line cards and switches packets between line cards. A system control processor 643 controls and monitors operation of the system card 641. The system card 641 also includes a local clock 649. The local clock 649 is synchronized to a clock that is in another network device that is coupled to the specialized media line card 611.

The system card 641 also includes a boundary clock 659 that is synchronized to a master clock of a network coupled to the Ethernet line card. The boundary clock 659 may be synchronized to the master clock using PTP messages sent between the network device of FIG. 6 and a network device having the master clock. The system card 641 may include a PHY for processing the PTP messages. The boundary clock 659 may be used by the Ethernet line card 601 to provide a master clock to another network device. In some embodiments, the local clock 649, the boundary clock 659, or both clocks may be located in the Ethernet line card 601.

Figure 7:
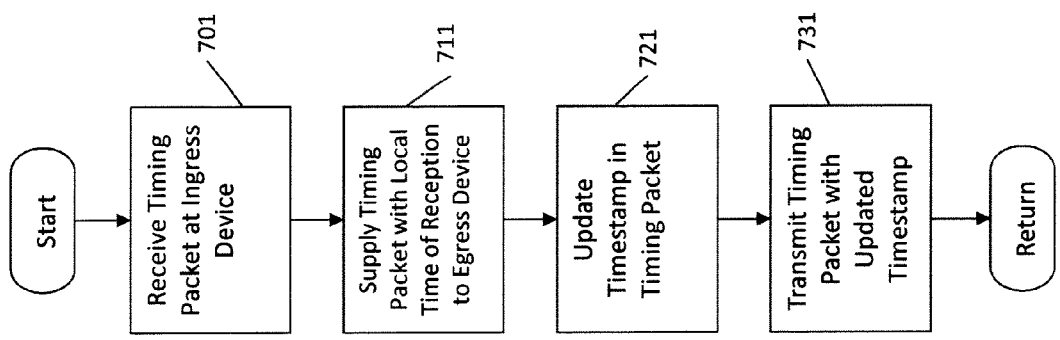
FIG. 7 is a flowchart of a process for handling timing information in accordance with aspects of the invention.

FIG. 7 is a flowchart of a process for handling timing information in accordance with aspects of the invention. The process may be implemented by network devices, for example, the devices of FIGS. 1-3. Additionally, the process may be implemented using a processor configured by software or a combination of hardware and software. The process may be used to provide a PTP-type transparent clock through network devices that do not provide PTP processing.

In block 701, the process receives a synchronization packet. The synchronization packet is received at a network device having a port that serves as an ingress port from a device using PTP synchronization. For example, the synchronization packet may be received from a network device that has a master clock. The process determines the time of reception of the packet. The time of arrival is determined using a clock local to the receiving network device.

In block 711, the process supplies the synchronization packet and the time of reception to a network device having a port that serves as an egress port to a device using PTP synchronization. For example, the egress port may be connected to a network device that has a slave clock. In one embodiment, the process supplies the time of reception by appending it to the synchronization packet. In another embodiment, the process supplies the time of reception by inserting it in the synchronization packet. For example, the time of reception of may be inserted at a particular location in the packet as shown in FIG. 4.

In block 721, the process updates the synchronization packet to indicate delay, or residency time, from when the packet was received to when it is transmitted. For example, the process may compute the delay by subtracting the time of reception from the time of transmission. The time of transmission may be, in various embodiments, a predicted time, a scheduled time, or an actual time. The time of transmission is determined using a clock local to the network device having the egress port. The local clocks of the network devices having the ingress and egress ports are synchronized. The clocks may be synchronized using a non-PTP technique, for example, using time of day delivery of GPON. The process may update the synchronization packet by modifying a timestamp or a correction field in the packet. For example, the process may add the delay to a value that was in the correction field when the packet was received. When the time of reception was appended to the synchronization packet in block 711, the process may remove the appended information in block 721.

In block 731, the process transmits the updated packet. The packet may be transmitted to a network device that will use the packet for PTP synchronization. Although the process provides a PTP-type transparent clock, the calculations used may be somewhat different. A PTP transparent clock may include an ingress link delay in its residency time, and the process of FIG. 7 may omit the ingress link delay from its residency time.

Figure 8:
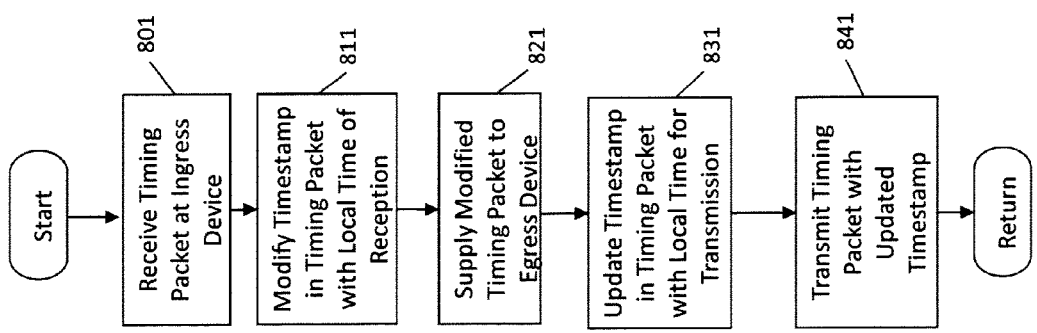
FIG. 8 is a flowchart of another process for handling timing information in accordance with aspects of the invention.

FIG. 8 is a flowchart of another process for handling timing information in accordance with aspects of the invention. The process is similar to the process of FIG. 7 and may also be used to provide a PTP-type transparent clock through network devices that do not provide PTP processing.

In block 801, the process receives a synchronization packet. The synchronization packet is received at a network device having a port that serves as an ingress port from a device using PTP synchronization, for example, a network device that has a master clock. The process determines the time of reception of the packet. The time of reception is determined using a clock local to the receiving network device.

In block 811, the process modifies the synchronization packet using the time of reception. The process modifies the packet by subtracting the time of reception from a value in the packet. For example, the process may subtract the time of reception from a value in a correction field of the packet when the packet was received and places replace the value in the correction field with the difference.

In block 821, the process supplies the modified packet to a network device having a port that serves as an egress port to a device using PTP synchronization. The modified packet may be transmitted through additional devices to reach the network device having the egress port.

In block 831, the process updates the synchronization packet. The updated synchronization packet indicates delay from when the packet was received to when it is transmitted. The process updates the packet using a time of transmission. The time of transmission may be, in various embodiments, a predicted time, a scheduled time, or an actual time. The time of transmission is determined using a clock local to the network device having the egress port. The local clocks of the network devices having the ingress and egress ports are synchronized to each other. The process adds the time of transmission to the value in the packet that was modified in block 811 and places the sum in the same field. Since the difference between the time of transmission and time of reception is indicated in the packet by operations in blocks 811 and 831, the packet includes an indication of the delay between reception and transmission.

In block 841, the process transmits the updated packet. The packet may be transmitted to a network device that will use the packet for PTP synchronization. For example, the process may transmit the updated packet to a network device that has a PTP slave clock.

Figure 9:
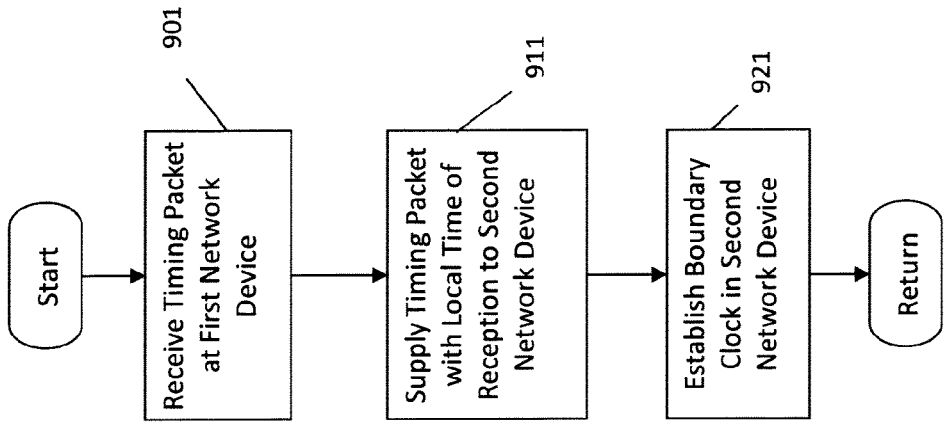
FIG. 9 is a flowchart of another process for handling timing information in accordance with aspects of the invention.

FIG. 9 is a flowchart of another process for handling timing information in accordance with aspects of the invention. The process may be implemented by network devices, for example, the devices of FIG. 3. Additionally, the process may be implemented using a processor configured by software or a combination of hardware and software. The process may be used to provide a PTP boundary clock through network devices that do not provide PTP processing.

In block 901, the process receives a synchronization packet. The synchronization packet is received at a first network device having a port that serves as an ingress port from a device using PTP synchronization. For example, the synchronization packet may be received from a network device that has a master clock. The process determines the time of reception of the packet. The time of reception is determined using a clock local to the receiving network device.

In block 911, the process supplies the synchronization packet and the time of reception from the first network device to a second network device. The packet may be transmitted through additional devices that do not process synchronization packets. The process may supply the time of reception by appending it to the synchronization packet or by inserting it in the synchronization packet.

In block 921, the process establishes a boundary clock in the second network device. The second network device has local clock that is synchronized to the local clock of the first network device. The local clocks may be synchronized using a non-PTP technique, for example, using time of day delivery in GPON. The process establishes the boundary clock utilizing the time of reception, the local clock, and information from the synchronization packet. The synchronization packet may, for example, include a time of day value for a PTP timing domain for which the process determines an offset relative to the local clock. The boundary clock is thus synchronized to the PTP timing domain.

Although various aspects of the invention have been discussed with respect to various embodiments, it should be recognized that the invention comprises the novel and nonobvious claims supported by this disclosure.

What is claimed is:

1. A method of performing timing related processing, the method comprising:
synchronizing a first local clock of a first Ethernet line card and a second local clock of a second Ethernet line card, the first and second Ethernet line cards separated by a non-precision time protocol network, the first Ethernet line card being part of a first node and the second Ethernet line card being part of a second node of the non-precision time protocol network, the first Ethernet line card and the second Ethernet line card each being connected to a precision time protocol network such that the first Ethernet line card sends and receives packets via a first communications port to and from the precision time protocol network and the second Ethernet line card sends and receives packets via a second communications port to and from the precision time protocol network;
determining a time of arrival of a packet at the first Ethernet line card;

inserting an indication of the time of arrival of the packet at the first Ethernet line card into a reserved field of the packet;

transmitting the packet over the non-precision time protocol network to the second Ethernet line card;

determining a time of departure of the packet from the second Ethernet line card; and adding a value equal to the time of departure of the packet from the second Ethernet line card minus the time of arrival of the packet at the first Ethernet line card to a value of a correction field of the packet.

2. The method of claim 1, wherein the first Ethernet line card includes a first PHY and the second Ethernet line card includes a second PHY, and the first PHY determines the time of arrival of the packet and the first Ethernet line card and the second PHY determines the time of departure of the packet from the second Ethernet line card.

3. The method of claim 1, wherein the indication of the time of arrival includes less resolution than allowed for by the reserved field of the packet.

4. The method of claim 3, wherein the indication of the time of arrival omits information with a resolution greater than an expected delay of transmission between the first Ethernet line card and the second Ethernet line card.

5. The method of claim 1, wherein the first node includes at least the first Ethernet line card, a system card, and a specialized medium line card, with the specialized medium line card connected to another node of the non-precision time protocol network.

6. The method of claim 5, wherein the other node is the second node.

7. The method of claim 5, wherein the non-precision time protocol network is a passive optical network.

8. The method of claim 1, wherein the clock of the first Ethernet line card and the clock of the second Ethernet line card are each synchronized to a network device coupled to the first node and the second node.

9. The method of claim 8, wherein the network device is coupled to a specialized medium line card of the first node and to a specialized medium line card of the second node.

* * * * *